US011494218B2

(12) United States Patent
Lee et al.

(10) Patent No.: US 11,494,218 B2
(45) Date of Patent: Nov. 8, 2022

(54) SERVER AND METHOD FOR CONTROLLING PACKET TRANSMISSION

(71) Applicant: Samsung Electronics Co., Ltd., Suwon-si (KR)

(72) Inventors: Ju-seong Lee, Suwon-si (KR); Se-young Oh, Seoul (KR); Jin-mok Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 16/767,299

(22) PCT Filed: Apr. 12, 2018

(86) PCT No.: PCT/KR2018/004284
§ 371 (c)(1),
(2) Date: May 27, 2020

(87) PCT Pub. No.: WO2019/117404
PCT Pub. Date: Jun. 20, 2019

(65) Prior Publication Data
US 2020/0409737 A1 Dec. 31, 2020

(30) Foreign Application Priority Data
Dec. 14, 2017 (KR) .......................... 10-2017-0172641

(51) Int. Cl.
G06F 9/455 (2018.01)
H04L 45/50 (2022.01)
(Continued)

(52) U.S. Cl.
CPC .......... G06F 9/45558 (2013.01); H04L 45/50 (2013.01); H04L 45/64 (2013.01);
(Continued)

(58) Field of Classification Search
CPC ......... G06F 9/45558; G06F 2009/4557; G06F 2009/45595; G06F 2009/45587;
(Continued)

(56) References Cited

U.S. PATENT DOCUMENTS 9,338,090 B2  5/2016 Sonoda et al.
9,407,612 B2  8/2016 Sood et al.
(Continued)

FOREIGN PATENT DOCUMENTS

CN  103597787 A  2/2014
CN  104717081 A  6/2015
(Continued)

OTHER PUBLICATIONS

International Search Report dated Sep. 7, 2018, issued in an International Application No. PCT/KR2018/004284.
(Continued)

Primary Examiner — Habte Mered
(74) Attorney, Agent, or Firm — Jefferson IP Law, LLP

(57) ABSTRACT

Provided is a method of controlling transmission of a packet, the method including generating first group generation information used to generate a plurality of first virtual machine groups by grouping at least one of a plurality of virtual machines in a first host server, based on a network service descriptor related to at least one service provided by a plurality of host servers, transmitting the first group generation information to the first host server, generating a packet transmission rule related to packets transmitted among the plurality of first virtual machine groups, based on the network service descriptor, transmitting the generated packet transmission rule to the first host server, receiving, from the first host server, a notification message notifying about receipt of a packet transmission request that violates the transmitted packet transmission rule, when receiving the
(Continued)

violating packet transmission request in the first host server, and outputting the notification message received from the first host server.

16 Claims, 13 Drawing Sheets

(51) Int. Cl.
  *H04L 45/64* (2022.01)
  *H04L 9/40* (2022.01)
(52) U.S. Cl.
  CPC .. *H04L 63/0263* (2013.01); *G06F 2009/4557* (2013.01); *G06F 2009/45595* (2013.01)
(58) Field of Classification Search
  CPC ..... H04L 45/50; H04L 45/64; H04L 63/0263; H04L 47/787; H04L 63/1416; H04L 41/0893; H04L 41/28; H04L 47/10
  See application file for complete search history.

(56) References Cited

U.S. PATENT DOCUMENTS

| | | | |
|---|---|---|---|
| 9,560,078 B2 | 1/2017 | Sood et al. | |
| 2014/0201348 A1 | 7/2014 | Anantharam et al. | |
| 2015/0341318 A1* | 11/2015 | Lee | H04L 63/20 726/11 |
| 2016/0330140 A1 | 11/2016 | Cook et al. | |
| 2017/0104679 A1 | 4/2017 | Sunavala et al. | |
| 2017/0141973 A1 | 5/2017 | Vrzic | |
| 2017/0180321 A1* | 6/2017 | Nimmagadda | H04L 63/0263 |
| 2018/0007005 A1* | 1/2018 | Chanda | H04L 63/20 |
| 2018/0018193 A1 | 1/2018 | Yabushita et al. | |
| 2018/0046481 A1* | 2/2018 | Wang | G06F 9/45558 |
| 2018/0176106 A1* | 6/2018 | Raney | H04L 12/4641 |
| 2018/0205673 A1* | 7/2018 | Jain | H04L 41/0803 |
| 2018/0262418 A1* | 9/2018 | Yang | H04L 45/021 |
| 2018/0285166 A1* | 10/2018 | Roy | G06F 9/5016 |
| 2018/0329730 A1* | 11/2018 | Bansal | G06F 9/45558 |
| 2018/0332006 A1* | 11/2018 | Zhao | H04L 63/0263 |
| 2018/0359145 A1* | 12/2018 | Bansal | G06F 9/45558 |

FOREIGN PATENT DOCUMENTS

| | | |
|---|---|---|
| KR | 10-2015-0032085 A | 3/2015 |
| KR | 10-1685471 B1 | 12/2016 |
| KR | 10-2017-0060814 A | 6/2017 |
| KR | 10-2017-0109603 A | 9/2017 |
| KR | 10-2017-0115046 A | 10/2017 |

OTHER PUBLICATIONS

VENOM; Virtualized Environment Neglected Operations Manipulation. http://venom.crowdstrike.com (May 13, 2015).
Chinese Office Action dated Jun. 30, 2022, issued in Chinese Application No. 201880080866.4.

* cited by examiner

FIG. 7

| VIRTUAL MACHINE GROUP GENERATION 710 | VIRTUAL MACHINE GROUP REMOVAL 720 | PACKET TRANSMISSION RULE ADDITION 730 | PACKET TRANSMISSION RULE DELETION 740 |
|---|---|---|---|
| `{`<br>`"Command" : "CreateVMGroup",`<br>`"VMGroup" : [`<br>`  {`<br>`    "VMGroupUUID" : "1234567890",`<br>`    "VMInfo" : [`<br>`      {`<br>`        "VMUUID" : "111111"`<br>`      },`<br>`      {`<br>`        "VMUUID" : "567822"`<br>`      }`<br>`    ]`<br>`  },`<br>`  {`<br>`    "VMGroupUUID" : "8888888888",`<br>`    "VMInfo" : [`<br>`      {`<br>`        "VMUUID" : "333444"`<br>`      },`<br>`      {`<br>`        "VMUUID" : "228854"`<br>`      },`<br>`      {`<br>`        "VMUUID" : "779914"`<br>`      }`<br>`    ]`<br>`  }`<br>`]`<br>`}` | `{`<br>`"Command" : "RemoveVMGroup",`<br>`"VMGroup" : [`<br>`  {`<br>`    "VMGroupUUID" : "1234567890"`<br>`  },`<br>`  {`<br>`    "VMGroupUUID" : "8888888888"`<br>`  }`<br>`]`<br>`}` | `{`<br>`"AllowList" : [`<br>`  {`<br>`    "VMGroupA" : "1234567890",`<br>`    "VMGroupB" : "5305305305"`<br>`  }`<br>`],`<br>`"Command" : "AddRule",`<br>`"DenyList" : [`<br>`  {`<br>`    "VMGroupD" : "0100000456",`<br>`    "VMGroupE" : "9876543210"`<br>`  }`<br>`],`<br>`"Priority" : 0`<br>`}` | `{`<br>`"AllowList" : [`<br>`  {`<br>`    "VMGroupA" : "1234567890",`<br>`    "VMGroupB" : "5305305305"`<br>`  },`<br>`  {`<br>`    "VMGroupA" : "1234567890",`<br>`    "VMGroupC" : "8888888888"`<br>`  }`<br>`],`<br>`"Command" : "DeleteRule",`<br>`"DenyList" : [`<br>`  {`<br>`    "VMGroupD" : "0100000456",`<br>`    "VMGroupE" : "9876543210"`<br>`  }`<br>`],`<br>`"Priority" : 0`<br>`}` |

FIG. 10

| | | Source | | Destination | | |
|---|---|---|---|---|---|---|
| Host Name | VM Group UUID | VM UUID | VM Group UUID | VM UUID | Action |
| node1 | xxxx-xxxx... | 12ec-53cd... | aaad-ar3d... | az93-zdr3... | Block / Ignore / Allow (1010) |
| node2 | yyyy-yyyy... | 342d-324d... | zcas-43dq... | acd3-adc3... | |

SERVER AND METHOD FOR CONTROLLING PACKET TRANSMISSION

TECHNICAL FIELD

The present disclosure relates to a server and a method for controlling packet transmission, and more particularly, to a server and a method for controlling packet transmission between virtual machines to securely transmit and receive packets according to a packet transmission rule in a network function virtualization (NFV) environment.

BACKGROUND ART

Network routing has been managed by an administrator of a central server, resulting in vulnerability to hacking when security is managed by an administrator who is unfamiliar with such security. As the development of communication and network technologies has enabled a network function and a part of an NFV infrastructure to be implemented with software, there is a need for a technique in which a central server may control communication between virtual machines and effectively notify whether packets are securely transmitted between allowed virtual machines.

DESCRIPTION OF EMBODIMENTS

Technical Problem

An embodiment of the present disclosure provides a central server and a method for controlling packet transmission in which a notification message for notifying about reception of a packet transmission request violating a packet transmission rule is received from a host server by transmitting the packet transmission rule to the host server.

An embodiment of the present disclosure provides a central server and a method for controlling packet transmission in which a notification message for notifying about reception of a packet transmission request violating a packet transmission rule is transmitted to a central server by receiving the packet transmission rule from the host server.

Solution to Problem

According to a first aspect of the present disclosure, a central server includes a memory storing at least one program, a communication unit, and at least one processor configured to control transmission of a packet among a plurality of virtual machines, by executing the at least one program, in which the at least one program may further include instructions for executing operations of generating first group generation information used to generate a plurality of first virtual machine groups by grouping at least one of a plurality of virtual machines in a first host server, based on a network service descriptor related to at least one service provided by a plurality of host servers, transmitting the first group generation information to the first host server, generating a packet transmission rule related to packets transmitted among the plurality of first virtual machine groups, based on the network service descriptor, transmitting the generated packet transmission rule to the first host server, receiving, from the first host server, a notification message notifying about receipt of a packet transmission request that violates the transmitted packet transmission rule, when receiving the violating packet transmission request in the first host server, and outputting the notification message received from the first host server.

According to a second aspect of the present disclosure, a method of controlling transmission of a packet includes generating first group generation information used to generate a plurality of first virtual machine groups by grouping at least one of a plurality of virtual machines in a first host server, based on a network service descriptor related to at least one service provided by a plurality of host servers, transmitting the first group generation information to the first host server, generating a packet transmission rule related to packets transmitted among the plurality of first virtual machine groups, based on the network service descriptor, transmitting the generated packet transmission rule to the first host server, receiving, from the first host server, a notification message notifying about receipt of a packet transmission request that violates the transmitted packet transmission rule, when receiving the violating packet transmission request in the first host server, and outputting the notification message received from the first host server.

According to a third aspect of the present disclosure, a host server includes a memory storing at least one program, a communicator, and at least one processor configured to control transmission of a packet between virtual machines by executing at least one program, in which the at least one program includes receiving group generation information used to generate a plurality of virtual machine groups by grouping at least one of a plurality of virtual machines in a host server, generating a plurality of virtual machine groups based on group generation information, replacing identification information of a virtual machine in each virtual machine group with identification information of a virtual machine group upon generation of the plurality of virtual machine groups, receiving a packet transmission rule related to a packet transmitted among the plurality of virtual machine groups from a central server, and transmitting a notification message notifying about receipt of a violating packet transmission request to the central server upon receipt of the packet transmission request that violates the packet transmission rule.

According to a fourth aspect of the present disclosure, a computer-readable recording medium has recorded thereon a program which, when executed by a computer, performs the method according to the second aspect of the present disclosure.

In an embodiment, the packet label may be determined based on a name of an interface through which packets are output from the virtual machine and an Internet protocol (IP) address of the virtual machine.

In an embodiment, packet transmission may be possible between virtual machines included in one of the plurality of first virtual machine groups, regardless of the packet transmission rule.

In an embodiment, a first virtual machine that is not grouped among a plurality of virtual machines in the first host server may not be able to transmit a packet to a second virtual machine in the first host server and a third virtual machine in the second host server.

In an embodiment, the at least one program further includes instructions for executing an operation of blocking transmission of a packet that violates based on the packet transmission rule among packets output from the virtual machine, when a packet label indicating the virtual machine having output the packet does not match the replaced identification information of the virtual machine group.

BRIEF DESCRIPTION OF DRAWINGS

FIG. 7 illustrates an example where a virtual machine group and a packet transmission rule are updated, according to an embodiment.

FIG. 10 illustrates an example in which a notification message is output, according to an embodiment.

BEST MODE

Figure 1:
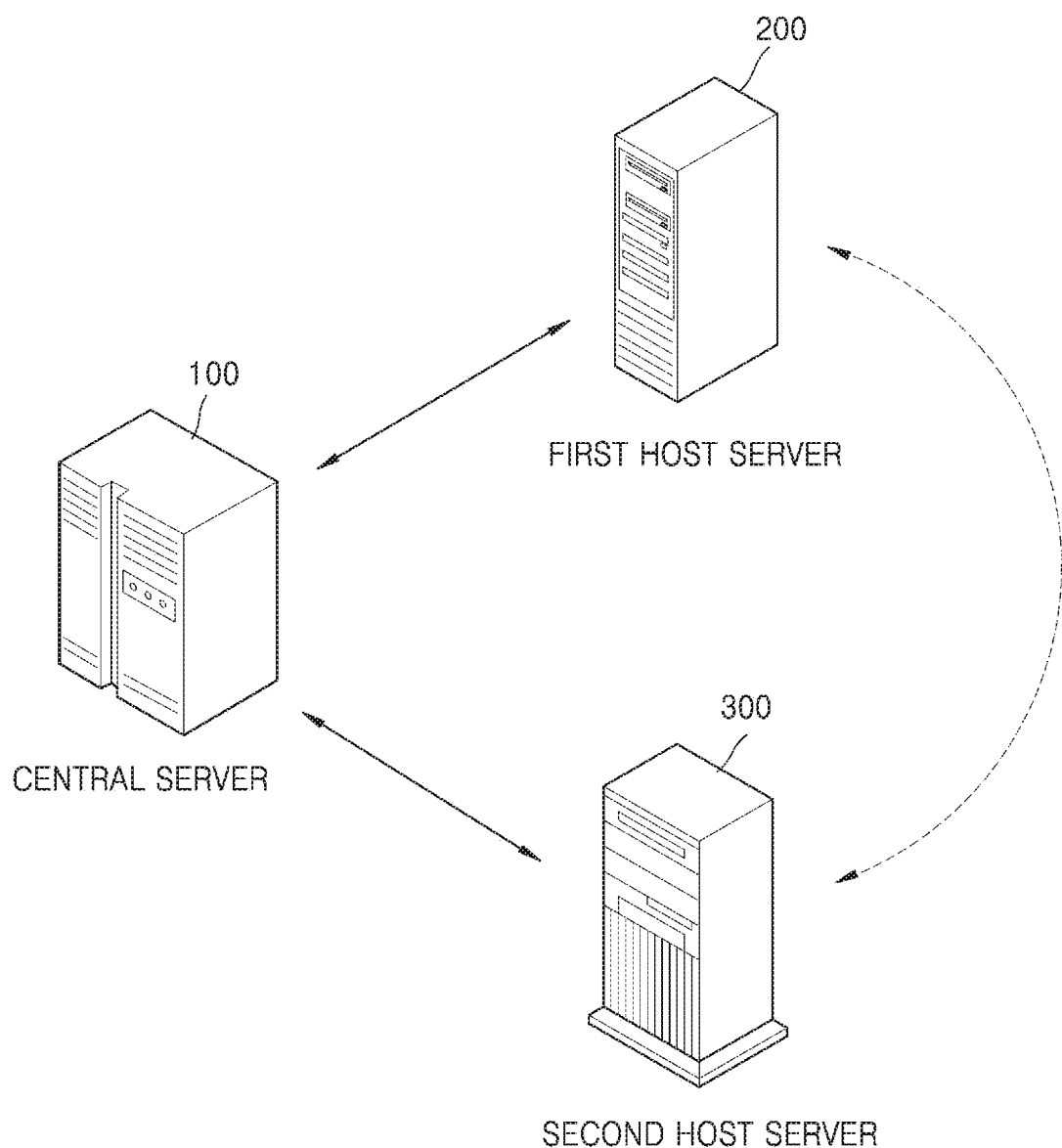
FIG. 1 illustrates an example where a central server and a host server communicate with each other, according to an embodiment.

According to an embodiment, a central server includes a memory storing at least one program, a communication unit, and at least one processor configured to control transmission of a packet among a plurality of virtual machines, by executing the at least one program, in which the at least one program may further include instructions for executing operations of generating first group generation information used to generate a plurality of first virtual machine groups by grouping at least one of a plurality of virtual machines in a first host server, based on a network service descriptor related to at least one service provided by a plurality of host servers, transmitting the first group generation information to the first host server, generating a packet transmission rule related to packets transmitted among the plurality of first virtual machine groups, based on the network service descriptor, transmitting the generated packet transmission rule to the first host server, receiving, from the first host server, a notification message notifying about receipt of a packet transmission request that violates the transmitted packet transmission rule, when receiving the violating packet transmission request in the first host server, and outputting the notification message received from the first host server.

Mode of Disclosure

Hereinafter, embodiments of the present disclosure will be described in detail with reference to the attached drawings to allow those of ordinary skill in the art to easily carry out the embodiments. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

In a description of the embodiments of the disclosure, when a part is connected to another part, the part is not only directly connected to another part but also electrically connected to another part with another device intervening in them. When it is assumed that a certain part includes a certain component, the term "including" means that a corresponding component may further include other components unless a specific meaning opposed to the corresponding component is written.

Hereinafter, embodiments will be described with reference to the accompanying drawings.

FIG. 1 illustrates an example where a central server and a host server communicate with each other, according to an embodiment.

Referring to FIG. 1, a central server 100 may communicate with a first host server 200 and a second host server 300. In a network function virtualization (NFV) environment, security of virtual machines installed in a plurality of host servers is managed by software, such that to reinforce security, a separate packet transmission rule may be required for communication between the first host server 200 and the second host server 300.

The central server 100 may generate the packet transmission rule based on a network service descriptor related to at least one service provided by the plurality of host servers. The network service descriptor may be provided from a communication standardization organization. The central server 100 may distribute a packet transmission rule required for communication of each host server with another host server to a plurality of host server. In an embodiment, the central server 100 may transmit the packet transmission rule to a first host server 200 and a second host server 300. The first host server 200 and the second host server 300 may isolate at least one of a plurality of virtual machines installed in the first host server 200 and the second host server 300 or establish a communication environment between the plurality of virtual machines, based on the packet transmission rule received from the central server 100. Thus, the first host server 200 and the second host server 300 may reinforce security by allowing packet transmission that does not violate the packet transmission rule.

The central server 100, the first host server 200, and the second host server 300 may be, but not limited to, a computing device or a program that provides information or a service through a network such as a cloud server, a web server, etc. The central server 100 may be any type of a device capable of transmitting the packet transmission rule to the first host server 200 and/or the second host server 300 and receiving a notification message from the first host server 200 and/or the second host server 300. The first host server 200 and the second host server 300 may be any type of a device capable of receiving the packet transmission rule from the central server 100 and transmitting a notification message to the central server 100.

The central server 100 may communicate with the first host server 200 and the second host server 300 through a certain network to control packet transmission between various virtual machines. In an embodiment, the network may include a local area network (LAN), a wide area network (WAN), a value added network (VAN), a mobile radio communication network, a satellite communication network, and a combination thereof. The network may also be a data communication network as a comprehensive meaning to enable each network entity to smoothly communicate, and may be a form in which the above-described heterogeneous communication networks are integrated, and may include wired Internet, wireless Internet, and a mobile wireless communication network. For example, wireless communication may include, but not limited to, a wireless LAN (wireless fidelity, Wi-Fi), Bluetooth, Bluetooth low energy, Zigbee, Wi-Fi direct (WFD), ultra wideband (UWB), infrared Data Association (IrDA), near field communication (NFC), and so forth.

Figure 2:
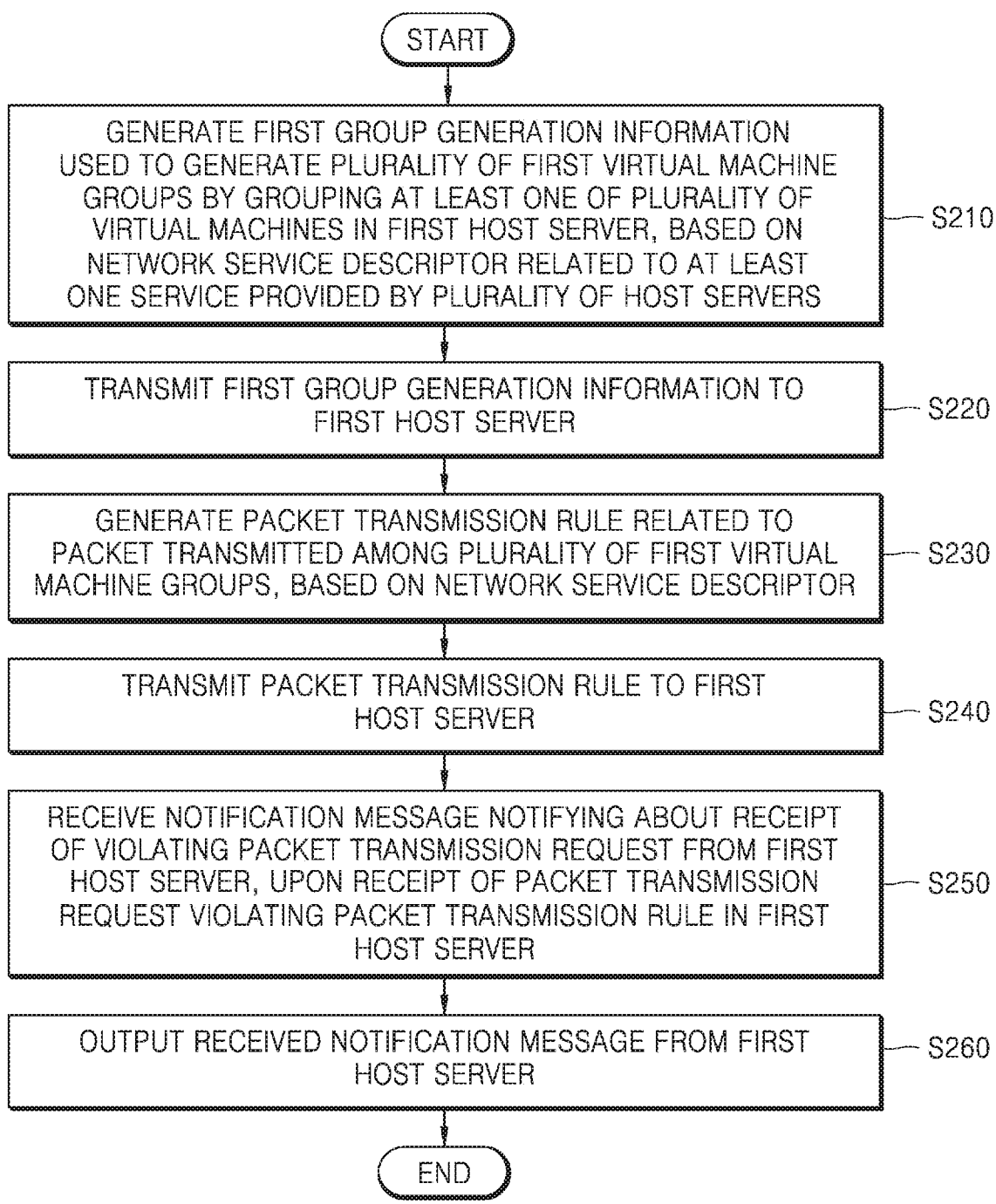
FIG. 2 is a flowchart illustrating a method of controlling packet transmission, according to an embodiment.

FIG. 2 is a flowchart illustrating a method of controlling packet transmission, according to an embodiment.

In operation S210, the central server 100 may generate first group generation information used to generate a plurality of first virtual machine groups by grouping at least one of a plurality of virtual machines in the first host server 200, based on a network service descriptor related to at least one service provided by the plurality of host servers.

While it is described that the first group generation information used to generate the plurality of first virtual machine groups is generated by grouping at least one of the plurality of virtual machines in the first host server 200, the first host server 200 may include one virtual machine in an embodiment. The first host server 200 may generate the first group generation information used to generate one first virtual machine group by grouping one virtual machine. Alternatively, the first host server 200 may include the plurality of virtual machines and generate the first group generation information used to generate one first virtual machine group by grouping at least one of the plurality of virtual machines. An example of generating the first group generation information based on the network service descriptor will be described later with reference to FIG. 4.

While it is described that at least one of the plurality of virtual machines in one host server is grouped, the central server 100 may also group the plurality of virtual machines in different host servers based on the network service descriptor. For example, the central server 100 may generate third group generation information used to generate a third virtual machine group by grouping at least one virtual machine in the first host server 200 and at least one virtual machine in the second host server 300.

In operation S220, the central server 100 may transmit the first group generation information to the first host server 200. In an embodiment, the central server 100 may transmit the first group generation information to the first host server 200 such that the first host server 200 provides a service through a plurality of first virtual machine groups. In an embodiment, the first host server 200 may request the central server 100 to transmit the first group generation information thereto to generate the plurality of first virtual machine groups. The central server 100 may transmit the first group generation information to the first host server 200 in response to a request from the first host server 200. The central server 100 may communicate with the first host server 200 through a certain network and transmit the first group generation information to the first host server 200 through the certain network.

In an embodiment, when the central server 100 generates the third group generation information, the central server 100 may transmit the third group generation information to the first host server 200 and the second host server 300.

In operation S230, the central server 100 may generate a packet transmission rule related to packets transmitted among the plurality of first virtual machine groups, based on the network service descriptor. An example of generating the packet transmission rule based on the network service descriptor will be described later with reference to FIG. 6.

In operation S240, the central server 100 may transmit the packet transmission rule to the first host server 200. In an embodiment, the central server 100 may communicate with the first host server 200 through a certain network and transmit the packet transmission rule to the first host server 200 through the certain network.

In operation S250, as the first host server 200 receives a packet transmission request that violates the packet transmission rule, the central server 100 may receive a notification message notifying about receipt of the violating packet transmission request from the first host server 200.

In operation S260, the central server 100 may output the notification message received from the first host server 200. In an embodiment, the central server 100 may transmit the notification message to an external display device to display the notification message or may display the notification message on a display of the central server 100. In an embodiment, the notification message may include information about at least one of a source virtual machine (Source VM) that is a transmission source of a packet violating the packet transmission rule, a destination virtual machine (Destination VM) that is a transmission destination of the violating packet, a host server in which the source virtual machine is installed, or a host server in which the destination virtual machine is installed.

An example of outputting the notification message will be described later with reference to FIG. 10.

Figure 3:
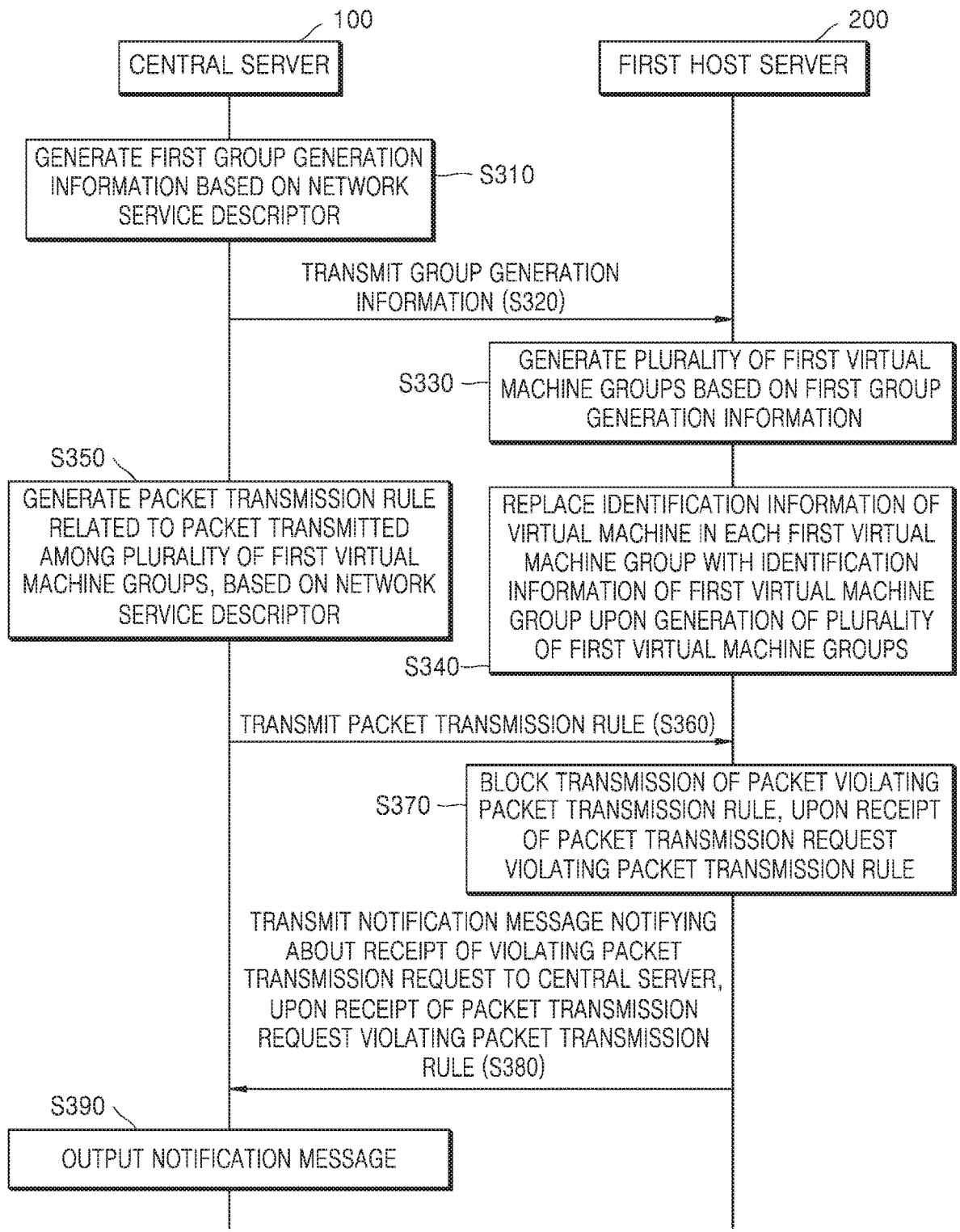
FIG. 3 is a flowchart illustrating a method of controlling packet transmission, according to an embodiment.

FIG. 3 is a flowchart illustrating a method of controlling packet transmission, according to an embodiment.

Operations S310 and S320 correspond to operations S210 and S220 of FIG. 2, and thus will not be described in detail.

In operation S330, the first host server 200 may generate the plurality of first virtual machine groups, based on the first group generation information. In an embodiment, the first host server 200 may not generate the plurality of first virtual machine groups, based on the first group generation information. The first host server 200 may generate one first virtual machine group or the plurality of first virtual machine groups, based on the first group generation information. An example of generating the first virtual machine group based on the first group generation information will be described later with reference to FIG. 4.

In operation S340, as the first host server 200 generates the plurality of first virtual machine groups, the first host server 200 may replace identification information of a virtual machine in each first virtual machine group with identification information of the first virtual machine group. In an embodiment, may include unique identification information. Each virtual machine group may have unique identification information. For example, the identification information may be, but not limited to, a universally unique identifier (UUID) that is an identifier standard used in software establishment.

In an embodiment, as the first host server 200 receives first group generation information for grouping a virtual machine with a UUID "8365" into a virtual machine group with a UUID "13356797", the first host server 200 may generate a virtual machine group with a UUID "133556797". As the first host server 200, as the virtual machine group with the UUID "133556797" is generated, may delete the UUID "8365" of the virtual machine with the UUID "8365" and assign a UUID "1234567890" of the virtual machine group.

Operations S350 and 5360 correspond to operations S230 and S240 of FIG. 2, and thus will not be described in detail.

In operation S370, upon receipt of a packet transmission request violating a packet transmission rule, the first host server 200 may block transmission of a packet violating the packet transmission rule. In an embodiment, when a packet label indicating a virtual machine outputting the packet does not match replaced identification information of the virtual machine group, the first host server 200 may block transmission of the packet violating the packet transmission rule among packets output from the virtual machine.

In an embodiment, the packet label may be determined based on a name of an interface through which packets are output from the virtual machine and an Internet protocol (IP) address of the virtual machine. For example, in the first host server 200, a name of an input interface of, a name of an output interface of, and an IP address of a virtual machine, which correspond to a virtual machine included in the first host server 200, may be stored. For example, the input interface of the virtual machine may be different from the output interface of the virtual machine or may be integrated with the output interface of the virtual machine into one interface. The IP address of the virtual machine may be forged through hacking, but a name of an interface of the virtual machine which outputs packets is uniquely determined at the time of creation of the virtual machine and thus may not be forged. Thus, even when the IP address is forged, the name of the output interface is authentic, such that there does not exist a virtual machine matching the forged IP address and the authentic name of the output interface, and thus packets output from the virtual machine having the forged IP address may have a default packet label. Identification information of the virtual machine matching the default packet label does not exist, such that transmission of a packet given the default packet label is blocked, reinforcing network security. For example, the name of the output interface may not be forged, such that a packet label may be determined based on the name of the output interface and the IP address, thus detecting the hacked virtual machine.

In operation S380, as the first host server 200 receives a packet transmission request that violates the packet transmission rule, the first host server 200 may transmit a notification message notifying about receipt of the violating packet transmission request to the central server 100. In an embodiment, the first host server 200 may detect whether the packet transmission request violating the packet transmission rule is received, based on the packet label and the identification information of the virtual machine. When the first host server 200 determines that the packet transmission request violates the packet transmission rule, the first host server 200 may ignore the violating packet transmission request, simultaneously with transmitting the notification message notifying about receipt of the violating packet transmission request to the central server 100. When the first host server 200 has not received an input for controlling an operation corresponding to the notification message from the central server 100 within a preset time from transmission of the notification message to the central server 100, the first host server 200 may block transmission of a packet violating the packet transmission rule. The first host server 200 may block transmission of the packet violating the packet transmission rule without transmitting the notification message to the central server 100.

Operation S390 may correspond to operation S260 of FIG. 2, and thus will not be described in detail.

Unless the order of operations of a method according to the present disclosure is explicitly mentioned or described otherwise, the operations may be performed in a proper order. The disclosure is not limited by the order the operations are mentioned. For example, operation S380 may be performed after operation S370 or operation S370 may be performed after operation S380, or operations S370 and S380 may be performed at the same time.

Figure 4:
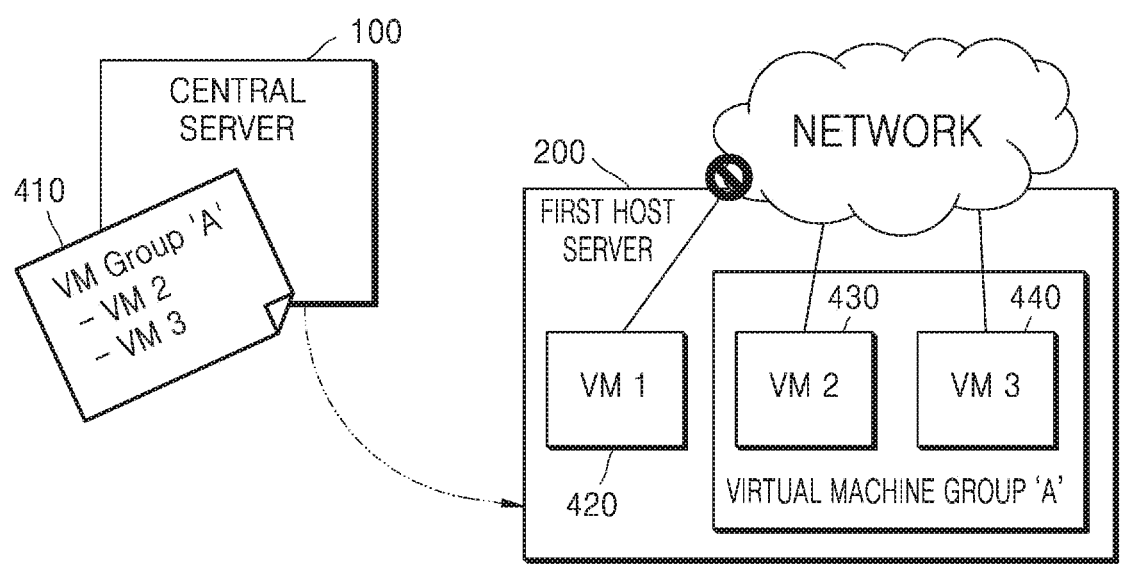
FIG. 4 illustrates an example where a virtual machine group is generated, according to an embodiment.

FIG. 4 illustrates an example where a virtual machine group is generated, according to an embodiment.

As shown in FIG. 4, the central server 100 may generate first group generation information 410 used to generate at least one virtual machine group by grouping at least one of a plurality of first through third virtual machines 420, 430, and 440 in the first host server 200. The first group generation information 410 may be generated based on a network service descriptor related to at least one service provided by a plurality of host servers, as described in the network service descriptor. For example, which virtualized network function (VNF) and virtualized network function component (VNFC) are included in the first host server 200 may be indicated in the network service descriptor. Herein, the VNF is a unit for performing a separate function of a network service, and may include one or more VNFCs. The VNFC may be a virtual machine, a container, etc., or herein, for convenience, will be described as a virtual machine. For example, in the network service descriptor, it may be described that the first host server 200 may include the first virtual machine 420, the second virtual machine 430, and the third virtual machine 440, and the second virtual machine 430 and the third virtual machine 440 are included in one VNF.

In an embodiment, when a virtual machine group is first generated, one VNF may correspond to one virtual machine group. Thus, the central server 100 may generate the first group generation information 410 used to generate a virtual machine group A by grouping the second virtual machine 430 and the third virtual machine 430 in the first host server 200, and transmit the first group generation information 410 to the first host server 200.

In an embodiment, the first host server 200 may generate the virtual machine group A by grouping the second virtual machine 430 and the third virtual machine 430, based on the generated first group generation information 410. Packet transmission is possible among a plurality of virtual machines included in one virtual machine group, regardless of a packet transmission rule, such that a packet may be freely transmitted between the second virtual machine 430 and the third virtual machine 440 included in the virtual machine group A. However, the second virtual machine 430 and the third virtual machine 440 included in the virtual machine group A may not communicate with a virtual machine that is not included in the virtual machine group A, without the packet transmission rule. For example, the second virtual machine 430 may transmit a packet to the third virtual machine 440, but may not transmit a packet to the first virtual machine 420. The first virtual machine 420 that is not grouped among the plurality of virtual machines 420, 430, and 440 in the first host server 200 may not communicate with another virtual machine. For example, the first virtual machine 420 may not transmit a packet to the second virtual machine 430 and the third virtual machine 430.

Figure 5A:
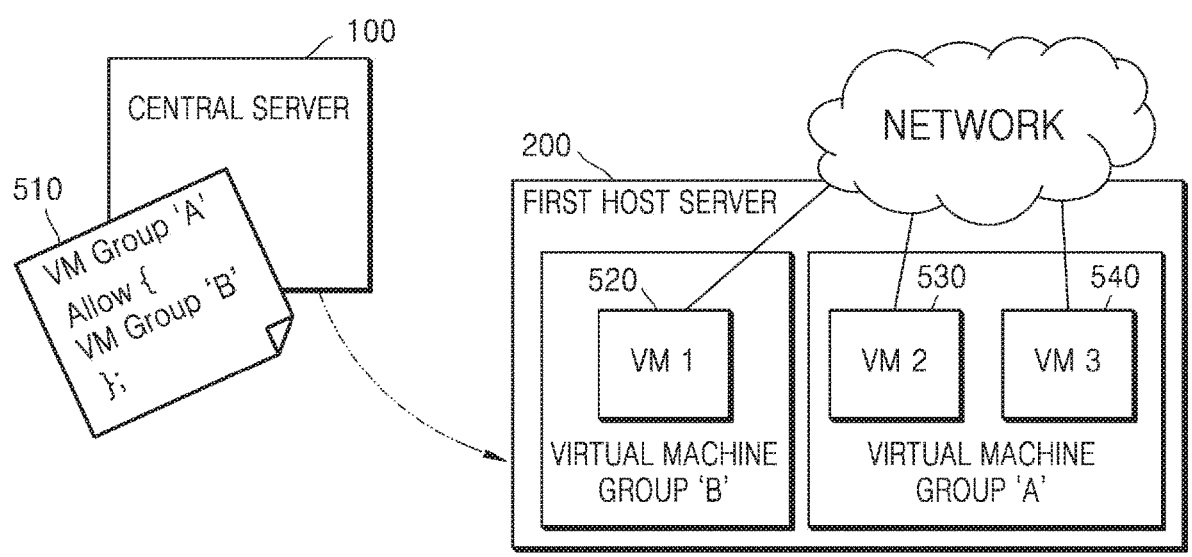
FIGS. 5A through 5C illustrate an example where a packet is transmitted between virtual machine groups, according to an embodiment.
Figure 5B:
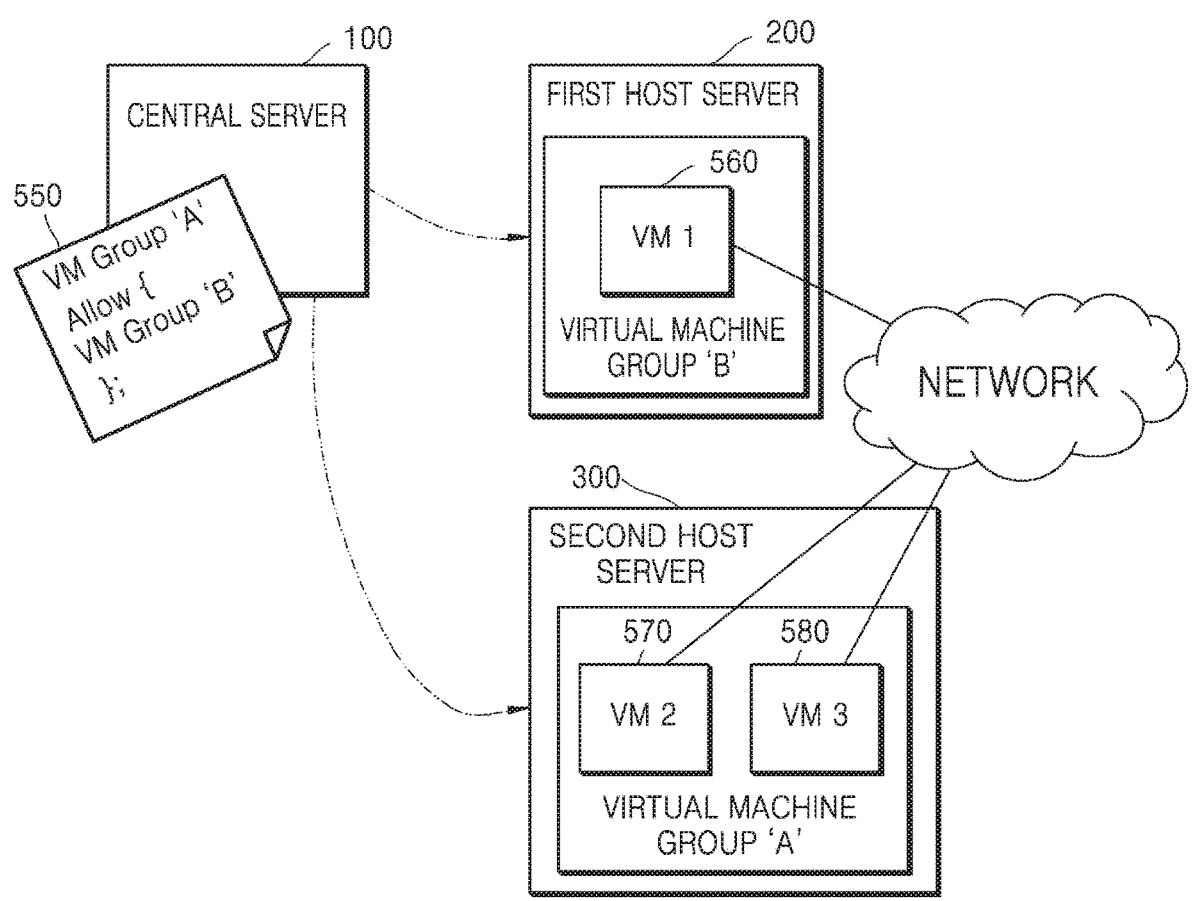
Figure 5C:
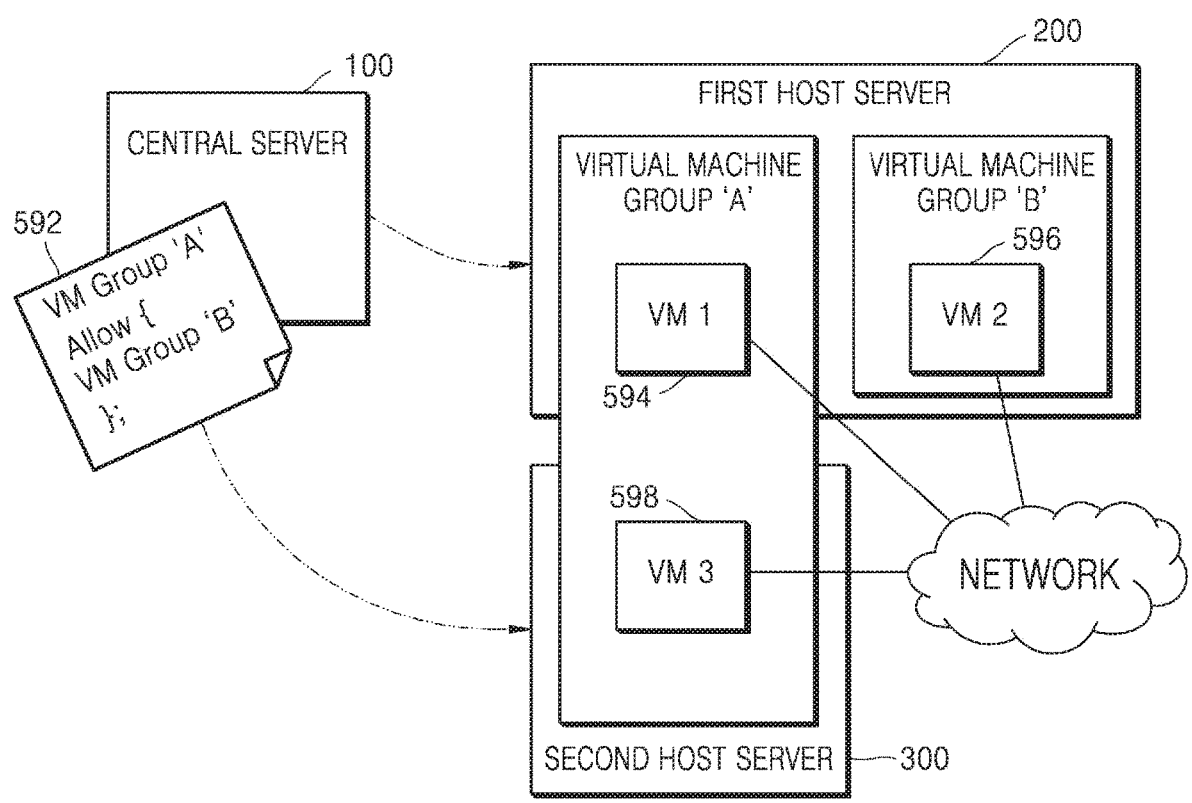

FIGS. 5A through 5C illustrate an example where a packet is transmitted between virtual machine groups, according to an embodiment.

As shown in FIG. 5A, in an embodiment, the central server 100 may generate first group generation information used to generate a plurality of virtual machine groups by grouping at least one of a plurality of virtual machines in the first host server 200, based on a network service descriptor.

In an embodiment, the central server 100 may transmit the first group generation information to the first host server 200. For example, the first host server 200 may store the first group generation information received from the central server 100 in a memory of the first host server 200. In the first host server 200, a virtual machine group B may be generated by grouping a first virtual machine 520 in the first host server 200, based on the generated first group generation information. In the first host server 200, the virtual machine group A may be generated by grouping a second virtual machine 530 and a third virtual machine 540 in the first host server 200, based on the generated first group generation information.

In an embodiment, the central server 100 may generate a packet transmission rule 510 related to a packet transmitted between the virtual machine group A and the virtual machine group B that are generated by the first host server 200, based on the network service descriptor. The central server 100 may transmit the packet transmission rule 510 to the first host server 200. For example, the packet transmission rule 510 may be a rule for allowing communication between the virtual machine group A and the virtual machine group B. According to the packet transmission rule 510, a packet may be freely transmitted between the second virtual machine 530 included in the virtual machine group A and the first virtual machine 520 included in the virtual machine group B. A packet may also be freely transmitted between the third virtual machine 540 included in the virtual machine group A and the first virtual machine 520 included in the virtual machine group B.

As shown in FIG. 5B, in an embodiment, the central server 100 may generate first group generation information used to generate at least one virtual machine group by grouping at least one of a plurality of virtual machines in the first host server 200, based on a network service descriptor. The central server 100 may also generate second group generation information used to generate at least one virtual machine group by grouping at least one of a plurality of virtual machines in the second host server 300, based on a network service descriptor.

In an embodiment, the central server 100 may transmit the first group generation information to the first host server 200 and the second group generation information to the second host server 300. For example, the first host server 200 may store the first group generation information received from the central server 100 in a memory of the first host server 200. In the first host server 200, a virtual machine group B may be generated by grouping a first virtual machine 560 in the first host server 200, based on the generated first group generation information. For example, the second host server 300 may store the second group generation information received from the central server 100 in a memory of the second host server 300. In the second host server 300, the virtual machine group A may be generated by grouping a second virtual machine 570 and a third virtual machine 580 in the second host server 300, based on the generated second group generation information.

In an embodiment, the central server 100 may generate a packet transmission rule 550 related to a packet transmitted between the virtual machine group A generated by the first host server 200 and the virtual machine group B generated by the second host server 300, based on the network service descriptor. The central server 100 may transmit the packet transmission rule 550 to the first host server 200 and the second host server 300. For example, the packet transmission rule 550 may be a rule for allowing communication between the virtual machine group A and the virtual machine group B. According to the packet transmission rule 550, a packet may be freely transmitted between the second virtual machine 570 included in the virtual machine group A and the first virtual machine 560 included in the virtual machine group B. A packet may also be freely transmitted between the third virtual machine 580 included in the virtual machine group A and the first virtual machine 560 included in the virtual machine group B.

As shown in FIG. 5C, the central server 100 may generate third group generation information used to generate a third virtual machine group by grouping at least one virtual machine in the first host server 200 and at least one virtual machine in the second host server 300, based on the network service descriptor.

In an embodiment, the central server 100 may generate third group generation information used to generate the virtual machine group A, by grouping a first virtual machine 594 in the first host server 200 and a third virtual machine 598 in the second host server 300. The central server 100 may transmit the first group generation information 410 to the first host server 200 and the second host server 300. The central server 100 may generate the first group generation information used to generate the virtual machine group B, by grouping a second virtual machine 596 among a plurality of virtual machines 594 and 596 in the first host server 200. The central server 100 may transmit the first group generation information to the first host server 200.

In an embodiment, the first host server 200 and the second host server 300 may generate the virtual machine group A by grouping the first virtual machine 594 and the third virtual machine 598, based on third group generation information. Packet transmission is possible among a plurality of virtual machines included in one virtual machine group, regardless of a packet transmission rule, such that a packet may be freely transmitted between the second virtual machine 594 and the third virtual machine 598 included in the virtual machine group A. That is, a packet may be freely transmitted in a virtual machine group between virtual machines in different host servers. In the first host server 200, a virtual machine group B may be generated by grouping a second virtual machine 596, based on the generated first group generation information.

In an embodiment, the central server 100 may generate a packet transmission rule 592 related to a packet transmitted between the virtual machine group A generated by the first host server 200 and the second host server 300 and the virtual machine group B generated by the first host server 200, based on the network service descriptor. The central server 100 may transmit the packet transmission rule 550 to the first host server 200 and the second host server 300. For example, the packet transmission rule 592 may be a rule for allowing communication between the virtual machine group A and the virtual machine group B. According to the packet transmission rule 592, a packet may be freely transmitted between the first virtual machine 594 included in the virtual machine group A and the second virtual machine 596 included in the virtual machine group B. A packet may also be freely transmitted between the third virtual machine 598 included in the virtual machine group A and the second virtual machine 596 included in the virtual machine group B.

Figure 6:
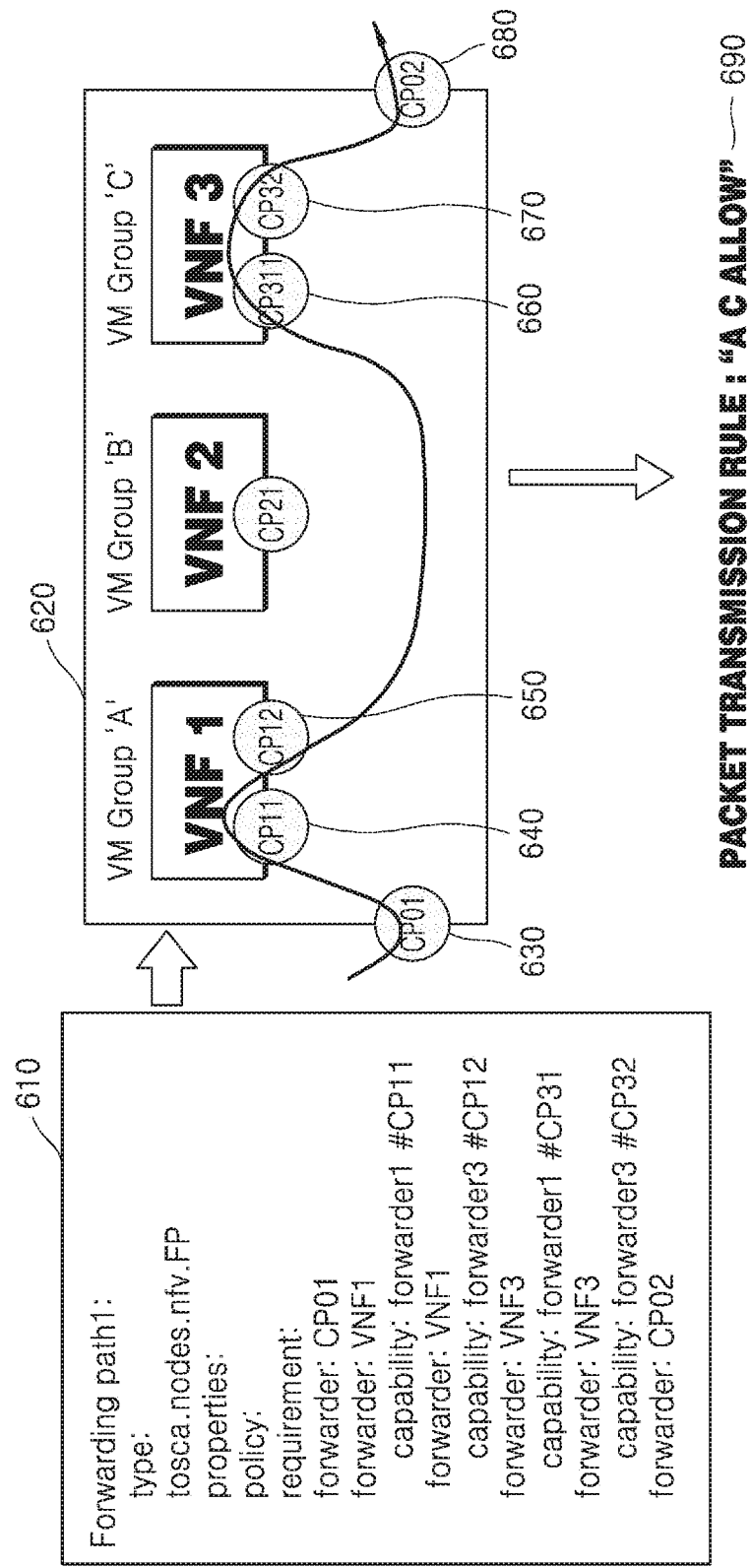
FIG. 6 illustrates an example where a packet transmission rule is generated, according to an embodiment.

FIG. 6 illustrates an example where a packet transmission rule is generated, according to an embodiment.

As shown in FIG. 6, the central server 100 may generate a packet transmission rule based on a forwarding graph 620 of a network service descriptor. In an embodiment, the forwarding graph 620 may show a forwarding path code 610 indicating a flow of a packet included in the network service descriptor, in the form of a graph. For example, the forwarding path code 610 may be a standard form used in an NFV environment.

In an embodiment, the first host server 200 may include a VNF 1, a VNF 2, and a VNF 3 respectively corresponding to the virtual machine group A, the virtual machine group B, and the virtual machine group C. In an embodiment, the first host server 200 may include an input interface CP01 630 and an output interface CP02 680. The VNF 1 may include an input interface CP11 640 and an output interface CP12 650, the VNF 2 may include an input/output interface CP21, and the VNF 3 may include an input interface CP31 660 and an output interface CP32 670. The forwarding graph 620 showing the forwarding path code 610 indicates that the packet sequentially passes through the CP01 630, the CP11 640, the CP12 650, the CP31 660, the CP32 670, and the CP02 680, such that the central server 100 may detect that transmission of the packet from the virtual machine group A to the virtual machine group C is allowed. The central server 100 may generate a packet transmission rule 690 allowing packet transmission between the virtual machine group A and the virtual machine group C. Thus, the central server 100 automatically generates a packet transmission rule based on the network service descriptor, thus providing a security service for controlling packet transmission according to a packet transmission rule to an administrator of the central server 100 that does not know a security policy well.

FIG. 7 illustrates an example where a virtual machine group and a packet transmission rule are updated, according to an embodiment.

In an embodiment, the administrator of the central server 100 may update the generated virtual machine group, based on the network service descriptor. The central server 100 may instruct at least one host server to generate a new virtual machine group in addition to an existing virtual machine group generated based on a network service descriptor, by receiving an input of a virtual machine group generation code 710 from the administrator. For example, each virtual machine may have unique identification information. Each virtual machine group may have unique identification information. Identification information may be a universally unique identifier (UUID) that is an identifier standard used in software establishment. As described in the virtual machine group generation code 710, the central server 100 may transmit a command for grouping a virtual machine having an UUID "111111" and a virtual machine having a UUID "567822" into a virtual machine group having a UUID "1234567890" to a host server, based on an input from the administrator.

In an embodiment, as a virtual machine group is generated, identification information of a virtual machine in a virtual machine group may be replaced with identification information of the virtual machine group. For example, as the virtual machine group having the UUID "1234567890" is generated, a host server including the virtual machine having the UUID "111111" may delete the UUID "111111" and give the UUID "1234567890". A host server including the virtual machine having the UUID "567822" may delete the UUID "567822" and give the UUID "1234567890".

In an embodiment, communication may be freely performed between virtual machines having the same UUID, regardless of the packet transmission rule. For example, a packet may be freely transmitted between virtual machines having the replaced UUID "1234567890".

In an embodiment, the central server 100 may instruct at least one host server to remove at least one of a plurality of existing virtual machine groups generated based on a network service descriptor, by receiving an input of a virtual machine group removal code 720 from the administrator. The central server 100 may transmit a command for removing a virtual machine group having an UUID "1234567890" and a virtual machine group having a UUID "8888888888" to at least one host server, based on an input from the administrator.

In an embodiment, as a virtual machine group is removed, identification information of a virtual machine group may be replaced with identification information of each virtual machine in the virtual machine group. For example, as the virtual machine group having the UUID "1234567890" is removed, a host server including the virtual machine group having the UUID "1234567890" may delete the UUID "1234567890" of the virtual machine that has had the existing UUID "111111" and give the existing UUID "111111" (to the virtual machine?). The host server may delete the UUID "1234567890" of the virtual machine that has had the existing UUID "567822" and give the existing UUID "567822".

In an embodiment, a first virtual machine that is not grouped among a plurality of virtual machines in the first host server 200 may not transmit a packet to a second virtual machine in the first host server 200 and a third virtual machine in the second host server 300. For example, communication may not be possible between virtual machines having different UUIDs, without a packet transmission rule. For example, the virtual machine having the UUID "111111" and the virtual machine having the UUID "567822" may be isolated, and thereafter, the virtual machines may be grouped or may not be able to transmit a packet without receiving an input for adding the packet transmission rule from the administrator.

In an embodiment, the administrator of the central server 100 may update the generated packet transmission rule, based on the network service descriptor. The administrator may update the packet transmission rule in response to a notification message notifying about receipt of a request violating the packet transmission rule or may update the packet transmission rule without receiving the notification message.

In an embodiment, the central server 100 may receive the input for adding the packet transmission rule or an input for deleting the packet transmission rule from the administrator. For example, the input for adding the packet transmission rule may be an input for adding a rule that allows packet transmission between virtual machine groups or a rule that does not allow packet transmission between virtual machine groups.

In an embodiment, the central server 100 may instruct at least one host server to generate a new packet transmission rule in addition to an existing packet transmission rule generated based on a network service descriptor, by receiving an input of a packet transmission rule addition code 730 from the administrator. The central server 100 may transmit a command for adding a packet transmission rule that does not allow packet transmission between a virtual machine group D having a UUID "0100000456" and a virtual machine group E having a UUID "9876543210" to at least one server, based on an input from the administrator. Packet transmission between the virtual machine group D and the virtual machine group E may not be possible.

In an embodiment, the central server 100 may instruct at least one host server to delete at least one of existing packet transmission rules generated based on a network service descriptor, by receiving an input of a packet transmission rule addition code 730 from the administrator. The central server 100 may transmit a command for deleting a packet transmission rule that does not allow packet transmission between a virtual machine group D having a UUID "0100000456" and a virtual machine group E having a UUID "9876543210" to at least one server, based on an input from the administrator. Packet transmission between the virtual machine group D and the virtual machine group E may be possible.

In an embodiment, there may be a plurality of administrators managing the central server 100. The central server 100 may receive an input for adding a first packet transmission rule from a first administrator of a preset first class among the plurality of administrators and an input for adding a second packet transmission rule from a second administrator of a preset second class among the plurality of administrators. For example, in case of conflict between the first packet transmission rule and the second packet transmission rule, the central server 100 may update a packet transmission rule by comparing the first class with the second class. For example, the class of the administrator may be implemented with a code "Priority", in which lower "Priority" may mean a higher class of the administrator. For example, when the first packet transmission rule allows packet transmission between the virtual machine group A and the virtual machine group B, and the second packet transmission rule does not allow packet transmission between the virtual machine group A and the virtual machine group B, the central server 100 may compare the first class with the second class, and transmit a request for allowing packet transmission between the virtual machine group A and the virtual machine group B according to the first packet transmission rule to at least one host server when the first class is higher than the second class.

Figure 8:
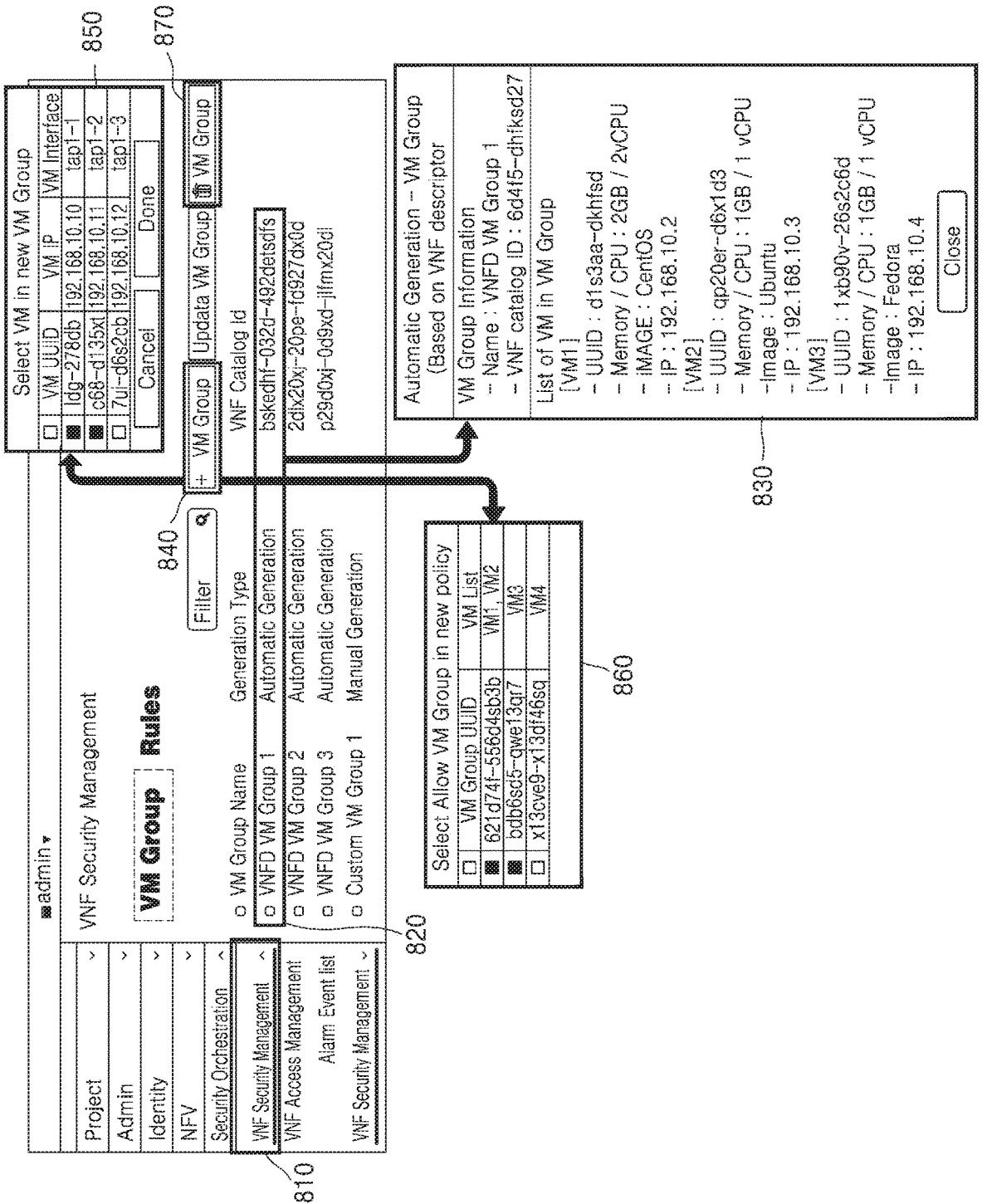
FIG. 8 illustrates an example where a virtual machine group and a packet transmission rule are updated, according to an embodiment.

FIG. 8 illustrates an example where a virtual machine group and a packet transmission rule are updated, according to an embodiment.

As described above with reference to FIG. 7, without input of a code, in an embodiment, the administrator of the central server 100 may update the generated virtual machine group and packet transmission rule, based on the network service descriptor.

In an embodiment, the central server 100 may display a VNF security management screen by receiving an input for selecting a VNF security management tap 810 from the administrator. On the VNF security management screen, virtual machine group information 820 may be included. The virtual machine group information 820 may include a name of a virtual machine group, a generation type of the virtual machine group, and a VNF catalog ID. The generation type of the virtual machine group may include an automatic generation type and a manual generation type, in which a virtual machine group generated based on a network service descriptor may correspond to an automatic generation type and a virtual machine group generated based on an input of the administrator may correspond to a manual generation type. For the virtual machine group corresponding to the automatic generation type, one virtual machine group corresponds to one VNF, and thus a unique VNF catalog ID exists, but for the virtual machine group corresponding to the manual generation type, one virtual machine does not correspond to one VNF, and thus a unique VNF catalog ID may not exist. When the central server 100 receives an input for selecting a part of the virtual machine group information 820, virtual machine group detailed information 830 indicating more detailed information of a corresponding virtual machine group may be displayed. In the virtual machine group detailed information 830, information about a virtual machine included in a virtual machine group that is not included in the virtual machine group information 820 may be included. The information about the virtual machine may include information about a UUID, a memory, an image, and an IP address of the virtual machine.

In an embodiment, as the central server 100 receives an input for selecting a virtual machine group generation button 840 from the administrator, a virtual machine selection window 850 for selecting at least one machine group to be grouped into a new virtual machine group may be displayed. The administrator may generate the new virtual machine group by selecting a virtual machine having a UUID "1dg-278db" and a virtual machine having a UUID "c68-d135xt" through the virtual machine selection window 850. The central server 100 may display a virtual machine group selection window 860 for selecting a virtual machine group to which a new packet transmission rule is to be applied. The administrator may add a packet transmission rule that allows packet transmission between a virtual machine group having a UUID "621d74f-556d4sb3b" and a virtual machine group having a UUID "bdb6sd5-qwe13qr7", through the virtual machine group selection window 860.

Figure 9:
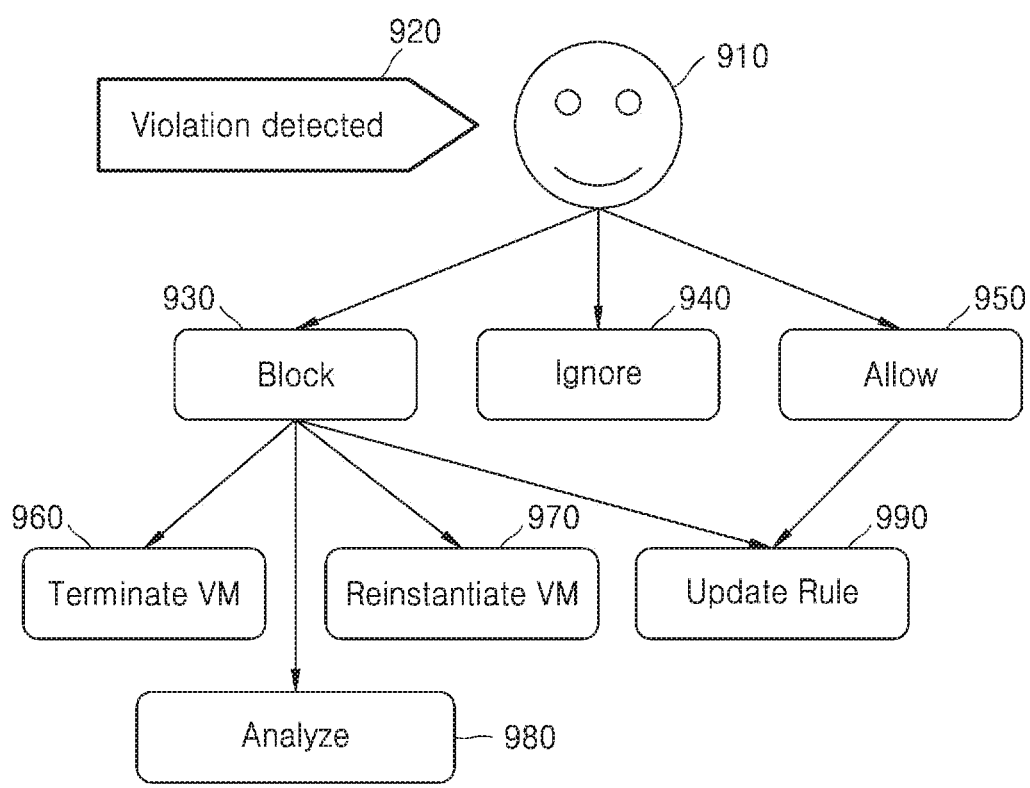
FIG. 9 illustrates an example where the packet transmission rule is updated based on an input from an administrator corresponding to a notification message, according to an embodiment.

FIG. 9 illustrates an example where the packet transmission rule is updated based on an input from an administrator corresponding to a notification message, according to an embodiment.

In an embodiment, the central server 100 may block 930 transmission of a packet that violates a packet transmission rule, based on an input from an administrator 910 corresponding to a notification message 920. For example, the central server 100 may transmit a request for terminating 960 a source virtual machine having output the packet violating the packet transmission rule to a host server where the source virtual machine is installed. For example, the central server 100 may transmit a request for re-installing 970 the source virtual machine having output the packet violating the packet transmission rule to the host server where the source virtual machine is installed. For example, the central server 100 may update 990 a packet transmission rule to additionally restrict or partially allow transmission of the packet that violates the packet transmission rule. For example, the central server 100 may transmit a request for analyzing 980 the source virtual machine having output the packet violating the packet transmission rule to the host server where the source virtual machine is installed. For example, the central server 100 may analyze the source virtual machine by using an external security service, to determine whether there is a security problem in the source virtual machine.

In an embodiment, the central server 100 may not receive the input from the administrator 910 corresponding to the notification message 920. For example, the administrator 910 may ignore 940 the notification message 920. Even when the administrator 910 ignores 940 the notification message 920, the host server may block transmission of the packet that violates the packet transmission rule, thus not allowing transmission of the violating packet.

In an embodiment, the central server 100 may update 990 the packet transmission rule to allow 950 transmission of the packet that violates the packet transmission rule, based on the input from the administrator 910 corresponding to the notification message 920.

FIG. 10 illustrates an example in which a notification message is output, according to an embodiment.

The central server 100 may output the notification message received from the first host server 200. In an embodiment, the central server 100 may transmit the notification message to an external display device to display the notification message or may display the notification message on a display of the central server 100. Alternatively, the central server 100 may output the notification message in the form of voice.

In an embodiment, the notification message may include information about at least one of a source virtual machine that is a transmission source of a packet violating the packet transmission rule, a destination virtual machine that is a transmission destination of the violating packet, a host server in which the source virtual machine is installed, or a host server in which the destination virtual machine is installed. As shown in FIG. 10, a notification message including a name of a host server in which the source virtual machine is installed, a UUID of a virtual machine group including the source virtual machine, a UUID of the source virtual machine, a UUID of a virtual machine group including a destination virtual machine, and a UUID of the destination virtual machine may be output.

In an embodiment, the administrator may determine a packet of which virtual machine is to be transmitted to which virtual machine, from the output notification message. Thereafter, an input to be made corresponding to the output notification message may be set in an action tap 1010. As described with reference to FIG. 9, for example, the administrator may ignore the notification message or block or allow transmission of the packet that violates the packet transmission rule according to the notification message.

Figure 11:
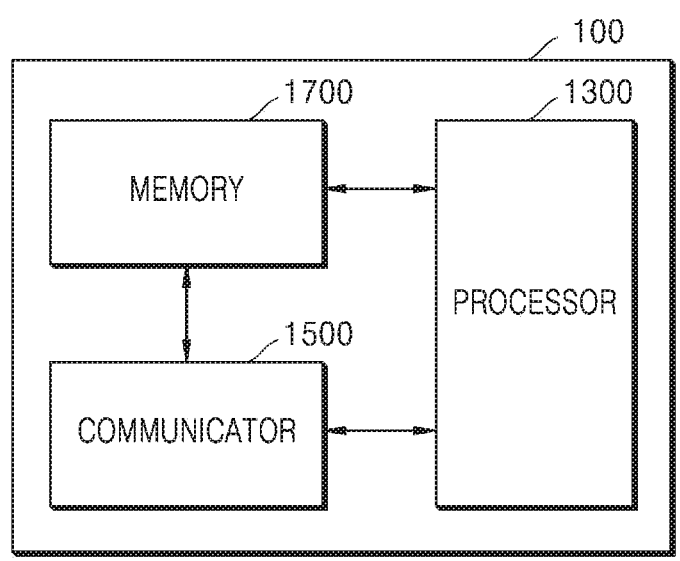
FIG. 11 is a block diagram of a central server according to an embodiment.

FIG. 11 is a block diagram of a central server according to an embodiment.

As shown in FIG. 11, the central server 100 according to an embodiment may include a processor 1300, a communicator 1500, and a memory 1700. However, all of the elements shown in FIG. 11 may not be essential elements of the central server 100. More elements or less elements than those shown in FIG. 11 may be used to implement the central server 100.

For example, the central server 100 according to an embodiment may further include an inputter (not shown) and an outputter (not shown) in addition to the processor 1300, the communicator 1500, and the memory 1700.

The inputter 1100 may indicate a means through which the administrator inputs data for controlling the central server 100. For example, the inputter (not shown) may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The inputter (not shown) may receive an input for updating a packet transmission rule from the administrator.

The outputter (not shown) may output an audio signal or a video signal, and may include a display (not shown) and an audio outputter (not shown).

The display (not shown) may display and output information processed by the central server 100. For example, the display (not shown) may display a user interface for updating the virtual machine group and the packet transmission rule. The display (not shown) may display the notification message for notifying about receipt of the packet transmission request that violates the packet transmission rule.

The audio outputter (not shown) may output audio data received from the communicator 1500 or stored in the memory 1700. The audio outputter 1220 may output an audio signal related to a function (e.g., a call signal receiving sound, a message receiving sound, an alarm sound, etc.) performed in the central server 100.

The processor 1300 may generally control an overall operation of the central device 100. For example, the processor 1300 may control the inputter (not shown), the outputter (not shown), and the communicator 1500 overall, by executing programs stored in the memory 1700. The controller 1300 executes a function of the central processor 100 disclosed in FIGS. 1 through 10 by executing programs stored in the memory 1700. The processor 1300 may include at least one processor. The processor 1300 may include a plurality of processors or one processor in an integrated form depending on a function and a role thereof.

In an embodiment, the processor 1300 may generate first group generation information used to generate a plurality of first virtual machine groups by grouping at least one of a plurality of virtual machines in the first host server 200, based on a network service descriptor related to at least one service provided by the plurality of host servers. The processor 1300 may control the communicator 1500 to transmit the first group generation information to the first host server 200. The processor 1300 may also generate second group generation information used to generate a plurality of second virtual machine groups by grouping at least one of a plurality of virtual machines in the second host server 300, based on a network service descriptor. The processor 1300 may control the communicator 1500 to transmit the second group generation information to the second host server 300.

In an embodiment, the processor 1300 may generate a packet transmission rule related to packets transmitted among the plurality of first virtual machine groups, based on the network service descriptor. The processor 1300 may generate a packet transmission rule related to a packet transmitted between the plurality of first virtual machine groups generated by the first host server 200 and the plurality of second virtual machine groups generated by the second host server 300, based on the network service descriptor. The processor 1300 may control the communicator 1500 to transmit the generated packet transmission rule to the first host server 200 and/or the second host server 300.

In an embodiment, as the first host server 200 receives a packet transmission request that violates the packet transmission rule, the processor 1300 may receive a notification message notifying about receipt of the violating packet transmission request from the first host server 200 through the communicator 1500. As the first host server 200 generates the first virtual machine group based on the first group generation information transmitted through the communicator 1500, identification information of a virtual machine in each first virtual machine group may be replaced with identification information of the first virtual machine group. When a packet label indicating the virtual machine having output the packet does not match the replaced identification information of the first virtual machine group, the notification message may be received from the first host server 200.

In an embodiment, the processor 1300 may control the outputter (not shown) to output the notification message received from the first host server 200.

In an embodiment, the processor 1300 may update the packet transmission rule based on the input through the inputter (not shown) from the administrator of the central server 100. For example, the processor 1300 may update the packet transmission rule to allow transmission of the packet that violates the packet transmission rule, based on the input from the administrator corresponding to the notification message. For example, the processor 1300 may control the communicator 1500 to transmit a request for reinstalling the virtual machine having output the packet violating the packet transmission rule to the first host server 200, based on the input from the administrator corresponding to the notification message. For example, when there are a plurality of administrators and conflict occurs between the first packet transmission rule updated from the first administrator of the preset first class and the second packet transmission rule updated from the second administrator of the preset second class, the processor 1300 may update the packet transmission rule by comparing the first class with the second class.

The communicator 1500 may include one or more elements that enable the central server 100 to communicate with the first host server 200, the second host server 300, and another device (not shown). The another device (not shown) may be, but not limited to, a computing device such as the central server 100. For example, the communicator 1500 may include a mobile communicator (not shown).

The mobile communicator (not shown) may transmit and receive a radio signal to and from at least one of a base station, an external terminal, the first host server 200, or the second host server 300 over a mobile communication network. Herein, the radio signal may include various forms of data corresponding to transmission/reception of a voice call signal, a video communication call signal, or a text/multimedia message.

In an embodiment, the communicator 1500 may transmit the first group generation information and the second group generation information to the first host server 200 and the second host server 300, respectively, and receive a notification message from the first host server 200 and the second host server 300. In an embodiment, the communicator 1500 may transmit and receive information required for generation and transmission of the first group generation information, the second group generation information, and the packet transmission rule to and from another device (not shown).

The memory 1700 may store programs for processing and control of the processor 1300 and data input to or output from the central server 100.

The memory 1700 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The programs stored in the memory 1700 may be classified into a plurality of modules depending on a function thereof, e.g., a user interface (UI) module (not shown), a touch screen module (not shown), a notification module (not shown), and so forth.

The UI module (not shown) provides a specialized UI or graphic UI (GUI) interworking with the central server 100 for each application. The touch screen module (not shown) may sense a touch gesture of a user on a touch screen and delivers information about the touch gesture to the processor 1300. The touch screen module (not shown) according to an embodiment may recognize and analyze a touch code. The touch screen module (not shown) may be configured with separate hardware including a controller.

The notification module (not shown) generates a signal for notifying of an occurrence of an event of the central server 100. Examples of the event occurring in the central server 100 may include key signal input, and so forth. The notification module (not shown) may output a notification signal in the form of a video signal through the display (not shown) and in the form of an audio signal through the audio outputter (not shown).

For example, the memory 1700 may store instructions or data related to at least one other elements of the central server 100. The memory may also store software and/or programs. The program may include a kernel, middleware, an application programming interface (API), and/or an application program (or "application"), and the like.

Some embodiments of the disclosure may be implemented with a recording medium including a computer-executable instruction such as a computer-executable programming module. A computer-readable recording medium may be an available medium that is accessible by a computer, and includes all of a volatile medium, a non-volatile medium, a separated medium, and a non-separated medium. The computer-readable recording medium may also include a computer storage medium. The computer storage medium includes all of a volatile medium, a non-volatile medium, a separated medium, and a non-separated medium, which is implemented by a method or technique for storing information such as a computer-readable instruction, a data structure, a programming module, or other data.

In the specification, the term "unit" may be a hardware component like a processor or a circuit, and/or a software component executed by a hardware component like a processor.

Those of ordinary skill in the art to which the present disclosure pertains will appreciate that the present disclosure may be implemented in different detailed ways without departing from the technical spirit or essential characteristics of the present disclosure. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the present disclosure is defined by the following claims rather than the detailed description, and the meanings and scope of the claims and all changes or modified forms derived from their equivalents should be construed as falling within the scope of the present disclosure.

The invention claimed is:

1. A central server comprising:
   a memory storing at least one program;
   a communication unit; and
   at least one processor configured to control transmission of a packet among a plurality of virtual machines, by executing the at least one program,
   wherein the at least one program further comprises instructions for executing operations of:
      generating first group generation information used to generate a plurality of first virtual machine groups by grouping at least one of a plurality of virtual machines in a first host server, based on a network service descriptor related to at least one service provided by a plurality of host servers;
      transmitting the first group generation information to the first host server;
      generating a packet transmission rule related to packets transmitted among the plurality of first virtual machine groups, based on the network service descriptor;
      transmitting the generated packet transmission rule to the first host server;
      receiving, from the first host server, a notification message notifying about receipt of a packet transmission request that violates the transmitted packet transmission rule, when receiving the violating packet transmission request in the first host server; and outputting the notification message received from the first host server, and wherein the at least one program comprises instructions for executing an operation of transmitting a request for re-installing a virtual machine having output a packet that violates the packet transmission rule to the first host server, based on an input from an administrator corresponding to the notification message.

2. The central server of claim 1, wherein as the plurality of first virtual machine groups are generated, identification information of a virtual machine in each first virtual machine group is replaced with identification information of the first virtual machine group, and when a packet label indicating a virtual machine having output the packet does not match the replaced identification information of the first virtual machine group, the notification message is received from the first host server.

3. The central server of claim 2, wherein the packet label is determined based on a name of an interface through which packets are output from a virtual machine, and an Internet protocol (IP) address of the virtual machine.

4. The central server of claim 1, wherein the at least one program further comprises instructions for executing operations of:

generating second group generation information used to generate a plurality of second virtual machine groups by grouping at least one of a plurality of virtual machines in a second host server, based on a network service descriptor; and transmitting the second group generation information to the second host server, and the generating of the packet transmission rule comprises generating the packet transmission rule related to the packet transmitted between the plurality of first virtual machine groups generated by the first host server and the plurality of second virtual machine groups generated by the second host server, based on the network service descriptor.

5. The central server of claim 1, wherein the generating of the first group generation information comprises generating third group generation information used to generate a third virtual machine groups by grouping at least one of the plurality of virtual machines in the first host server and at least one of a plurality of virtual machines in a second host server, based on the network service descriptor, and the transmitting the first group generation information to the first host server comprises transmitting the third group generation information to the first host server and the second host server.

6. The central server of claim 1, wherein packet transmission is possible between virtual machines included in one of the plurality of first virtual machine groups, regardless of the packet transmission rule.

7. The central server of claim 1, wherein a first virtual machine that is not grouped among a plurality of virtual machines in the first host server is not able to transmit a packet to a second virtual machine in the first host server and a third virtual machine in a second host server.

8. The central server of claim 1, wherein the at least one program further comprises instructions for executing an operation of updating the packet transmission rule, based on an input from an administrator of the central server.

9. The central server of claim 8, wherein the updating of the packet transmission rule comprises updating the packet transmission rule to allow transmission of a packet that violates the packet transmission rule, based on an input from the administrator corresponding to the notification message.

10. The central server of claim 7, wherein the updating of the packet transmission rule comprises:

receiving an input for adding a first packet transmission rule from a first administrator of a preset first class among a plurality of administrators managing the central server;

receiving an input for adding a second packet transmission rule from a second administrator of a preset second class among the plurality of administrators; and updating the packet transmission rule by comparing the first class with the second class, when conflict occurs between the first packet transmission rule and the second packet transmission rule.

11. A method of controlling transmission of a packet, the method comprising:

generating first group generation information used to generate a plurality of first virtual machine groups by grouping at least one of a plurality of virtual machines in a first host server, based on a network service descriptor related to at least one service provided by a plurality of host servers;

transmitting the first group generation information to the first host server;

generating a packet transmission rule related to packets transmitted among the plurality of first virtual machine groups, based on the network service descriptor;

transmitting the generated packet transmission rule to the first host server;

receiving, from the first host server, a notification message notifying about receipt of a packet transmission request that violates the transmitted packet transmission rule, when receiving the violating packet transmission request in the first host server;

outputting the notification message received from the first host server; and transmitting a request for re-installing a virtual machine having output a packet that violates the packet transmission rule to the first host server, based on an input from an administrator corresponding to the notification message.

12. The method of claim 11, wherein, as the plurality of first virtual machine groups are generated, identification information of a virtual machine in each first virtual machine group is replaced with identification information of the first virtual machine group, and when a packet label indicating a virtual machine having output the packet does not match the replaced identification information of the first virtual machine group, the notification message is received from the first host server.

13. The method of claim 11, further comprising:

generating second group generation information used to generate a plurality of second virtual machine groups by grouping at least one of a plurality of virtual machines in a second host server, based on a network service descriptor; and transmitting the second group generation information to the second host server, wherein the generating of the packet transmission rule comprises generating the packet transmission rule related to the packet transmitted between the plurality of first virtual machine groups generated by the first host server and the plurality of second virtual machine groups generated by the second host server, based on the network service descriptor.

14. A non-transitory computer-readable recording medium having recorded thereon a program for executing the method of claim 11 on a computer.

15. The central server of claim 1, wherein the notification message includes information of a host server in which the source virtual machine is installed, information of a virtual machine group including the source virtual machine, information of the source virtual machine, information of a virtual machine group including a destination virtual machine, and information of the destination virtual machine.

16. The method of claim 11, wherein the notification message includes information of a host server in which the source virtual machine is installed, information of a virtual machine group including the source virtual machine, information of the source virtual machine, information of a virtual machine group including a destination virtual machine, and information of the destination virtual machine.

\* \* \* \* \*